(12) United States Patent
Heuft

(10) Patent No.: US 6,240,769 B1
(45) Date of Patent: Jun. 5, 2001

(54) METHOD FOR TESTING SEALED CONTAINERS

(75) Inventor: Bernhard Heuft, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 09/485,762

(22) PCT Filed: Aug. 25, 1998

(86) PCT No.: PCT/EP98/05380

§ 371 Date: Feb. 15, 2000

§ 102(e) Date: Feb. 15, 2000

(87) PCT Pub. No.: WO99/10722

PCT Pub. Date: Mar. 4, 1999

(30) Foreign Application Priority Data

Aug. 25, 1997 (DE) .............................................. 197 36 869

(51) Int. Cl.[7] .................................................. G01M 3/34
(52) U.S. Cl. ................................. 73/49.3; 73/49.2; 73/52
(58) Field of Search .......................... 73/49.3, 52, 290, 73/599, 600, 588, 861.18, 861.25, 579; 367/908; 340/621

(56) References Cited

U.S. PATENT DOCUMENTS

| | | | |
|---|---|---|---|
| 2,412,240 | * 12/1946 | William et al. | 73/67 |
| 3,246,516 | * 4/1966 | Maropis | 73/290 |
| 3,597,896 | * 8/1971 | Koll | 53/42 |
| 3,623,358 | * 11/1971 | Sugimoto | 73/67.2 |
| 3,645,129 | * 2/1972 | Grant | 73/67 |
| 3,802,252 | 4/1974 | Hayward et al. | 73/52 |
| 3,866,463 | * 2/1975 | Smith et al. | 73/99 |
| 3,982,426 | * 9/1976 | Newhouse et al. | 73/67.9 |
| 4,145,916 | * 3/1979 | Bott et al. | 73/49.3 |
| 4,187,718 | 2/1980 | Shibasaki | 73/52 |
| 4,212,205 | * 7/1980 | West et al. | 73/579 |
| 4,248,087 | * 2/1981 | Dennis et al. | 73/290 |
| 4,292,839 | * 10/1981 | Hartness | 73/49.2 |
| 4,414,849 | * 11/1983 | Brown et al. | 73/290 V |
| 4,674,340 | * 6/1987 | Burt et al. | 73/862.23 |
| 4,837,707 | * 6/1989 | Giometti et al. | 364/552 |
| 5,035,139 | * 7/1991 | Hoefelmayr | 73/223 |
| 5,094,112 | * 3/1992 | Hoefelmayr | 73/861.04 |
| 5,144,838 | 9/1992 | Tsuboi | 73/579 |
| 5,353,631 | 10/1994 | Woringer et al. | 73/52 |
| 5,505,090 | * 4/1996 | Webster | 73/657 |
| 5,821,424 | * 10/1998 | Rodriquez | 73/657 |
| 5,861,548 | * 1/1999 | Melvin, II et al. | 73/52 |
| 5,869,747 | * 2/1999 | Hulsman | 73/52 |
| 5,880,359 | * 3/1999 | Kono et al. | 73/49.3 |
| 5,918,270 | * 6/1999 | Heuft | 73/45.4 |
| 5,922,945 | * 7/1999 | Allmaras et al. | 73/52 |

FOREIGN PATENT DOCUMENTS

| | | | |
|---|---|---|---|
| 25 34 953 | 2/1976 | (DE) | G01F/17/00 |
| 28 00 842 | 7/1979 | (DE) | B65D/79/00 |
| 38 03 325 A1 | 8/1989 | (DE) | G01M/1/22 |
| 40 04 965 A 1 | * 8/1991 | (DE) | G01M/3/40 |
| 93 01 272 | 1/1993 | (DE) | B67B/3/26 |

* cited by examiner

Primary Examiner—Hezron Williams
Assistant Examiner—C D Garber
(74) Attorney, Agent, or Firm—Gardner, Carton & Douglas

(57) ABSTRACT

To test the features of containers (10) which are sealed by means of a closure (12), such as central fit of the closure (12) on the container opening, tightness of the fitting of the closure (12) or the residual air volume in containers (10) in which the liquid is foamed up before closure, in order to expel the residual air volume, mechanical vibrations are excited in the closure (10) and the mechanical vibrations are analysed. The mechanical vibrations are analysed directly after the closure (12) has been fitted, before major change in the pressure takes place in the container.

11 Claims, 5 Drawing Sheets

METHOD FOR TESTING SEALED CONTAINERS

BACKGROUND OF THE INVENTION

The invention relates to a method for testing features of containers which are sealed by a closure, mechanical vibrations being excited in the closure and the mechanical vibrations being analysed. These feature may be for example the central fit of the closure on the container opening, the tightness of the attachment of the closure to the container opening or the residual air volume in containers in which the liquid is foamed up prior to closure in order to expel the residual air or which are to be filled to the rim for process-related reasons.

It is known from DE-A-40 04 965 to test below-atmospheric pressure closures with a spring-return top, in particular below-atmospheric pressure screw-type caps, for the tightness of their attachment by creating mechanical vibrations in the top, processing and evaluating the vibrations as regards their frequency, duration, time integral of the amplitude and/or attenuation and ascertaining the level of the below-atmospheric pressure in the container from this. The below-atmospheric pressure can for example be produced by blowing steam into the remaining residual volume of the container or by pouring the drink in hot. In each case, the below-atmospheric pressure develops only after the steam has cooled or when the drink has assumed the ambient temperature. Similar methods for measuring the tightness of the closure are also known for containers, in which the contents are subjected to above-atmospheric pressure, in particular drinks bottles with carbonated drinks such as mineral waters or beer. This above-atmospheric pressure also builds up only gradually. Testing the tightness of container closures indirectly by testing the above-atmospheric pressure or below-atmospheric pressure in a container is thus possible only if the below-atmospheric pressure has formed through temperature equalization or a degree of above-atmospheric pressure has formed through escaping carbonic dioxide. Immediately after the closures have been fitted by a closer, it is therefore necessary to wait for a certain time before the tightness test can be carried out. The containers are transported further for approx 8 m on a conveyor at a speed of approximately 0.5 m/s to 1.5 m/s during this time; assuming that a noticeable rise or drop in pressure arises only after 5–10 seconds at the earliest (even later for hot pouring), testing via differences in pressure is possible, according to the sensitivity of the measurement apparatus only from 5 to 10 meters behind the closer. In particular, because not only is the rise/drop in pressure small, but in addition the leak is extremely small.

When filling foaming drinks, in particular beer, care must be paid to enclose as little air as possible in the bottle, as the taste of the beer is adversely effected by the atmospheric oxygen. There is no possibility of continuously measuring the level of the enclosed air volume. At present, the level of air volume can only be checked by random spot checks by opening the beer bottle.

BRIEF DESCRIPTION OF THE INVENTION

The object of the invention is to facilitate the easiest possible testing of features of containers with closures.

This object is achieved with a method of the type mentioned initially in that the analysis of the vibrations excited in the closure is carried out directly after the fitting of the closures, i.e. before a noticeable below-atmospheric pressure or above-atmospheric pressure has built up in the container.

Features such as the central fit of the closure, the quality of the crimping with crown cap closures or the tightness of the attachment of the closure in twist-off closures or the correct fit and closure for can tops can be tested by the method according to the invention, also with products or filling techniques which produce no vacuum or above-atmospheric pressure. Furthermore a continuous monitoring of the air volume enclosed in the container is made possible for foaming drinks.

In particular, the frequency, the decay time of the vibration (attenuation), the time integral of the vibration amplitude and/or the absolute intensity of the vibration are examined when analysing the mechanical vibrations of the closure.

The mechanical vibration in the closure can be excited by a short magnetic pulse produced by means of a magnetic coil or by a short ultra sound pulse or mechanical impact. The mechanical vibrations of the closure can be detected by a microphone, inductively or by similar means.

The method according to the invention is firstly explained in more detail in the following, insofar as it relates to the examination and testing of the correct fit of container closures. The preferred procedure for this examination is that the decay time oft-the vibration is determined and it is checked, whether the decay time lies outside a specific threshold value range, which is then interpreted as an indication of an incorrect fit of the container closure.

Another or additional test criterion is the time integral of the vibration intensity (amplitude), which is referred to in the following as "energy".

Testing occurs each time directly after the container closure has been attached. The influence of a change in the internal pressure after the container has been sealed can thereby be largely eliminated, as such a change in the internal pressure arises only with a certain time delay.

The object of the invention is finally to guarantee that the containers are tightly sealed. The tightness is however ascertained not directly by determining the internal pressure, but by the fact that the most frequent cause of leaking container closures is ascertained, namely the incorrect fit of the closure.

It has been shown that container closures, in particular crown cap tops, which sit crookedly or non-centrally on the opening of a drinks bottle differ from closures with the correct fit as regards vibration behaviour. The measurement of the vibration frequency does not in general permit certain distinction, as the frequency of crooked closures can also lie in the range of centered closures. The decay time of the vibration and the energy of the vibration have on the other hand proved to be a much more reliable distinguishing criterion. Both values admittedly also depend to a certain degree on the internal pressure. Mainly, however, they depend on the correct attachment of the closure to the container. It is plausible that a crooked top, similarly to an asymmetrically stretched eardrum, cannot develop clean vibrations. In particular, if the top sits so crookedly on the bottle that there is an aperture on one side between the top and the rim of the opening, top vibrations decay very quickly. It has been shown that the method according to the invention has an approx. 10% better certainty of recognition than a method in which the tightness of a closure is ascertained by means of frequency analysis.

In the earlier German Patent Application "Verfahren zur Bestimmung von Parametern, e.g. Fullstand, Druck, Gaszusammensetzung in verschlossenen Behältern" [Method for determining the parameters, e.g. fill level, pressure, gas composition in sealed containers], official file no. 196 46 685.7 dated Nov. 12 1996 (=PCT/EP97/06298- WO 9821557), a method for determining parameters of closed containers is given in which primary mechanical vibrations are excited in a container wall and then the secondary vibrations excited by the primary mechanical vibrations of the container wall in the container, which take place within the space between closure and the liquid, are recorded and analysed, the sought-after parameters being ascertained from the established frequency of the secondary vibrations. There is a time lag between the primary vibrations and the secondary vibrations, which can be recorded separately by correspondingly staggered measurement windows. The vibration to be observed in the second measurement window is attributable to the development of a standing wave between the top and the surface of the liquid. In a bottle which is not sealed correctly, the development of this standing wave is disrupted, which is revealed in particular in smaller values of the measured energy of the secondary vibrations.

The method according to the invention is suitable both for crown caps, which are crimped on as well as screw closures, whose thread is formed only by rolling-on, and for twist-off closures, as well as for can tops.

Devices for fitting closures onto drinks bottles, so-called closers, consist in general of several crimping or rolling-on organs. It was ascertained that the individual closure organs produce closures with different values for decay time, energy and frequency of the vibration pattern. It has been shown in particular that with many closers a change in the filling and closing speed is reflected in a change in the closing force which means that the values for the decay time, the energy and the frequency of the individual closure organs are dependent on the filling and closing speed and can be adjusted accordingly to obtain an optimum consistency. Clear differences show themselves in particular in the frequency evaluation, which is attributable to the fact that the individual closure organs produce closures with different initial expulsions. The test method according to the invention can thus be improved by allocating to each of the individual closure organs its own limiting values for judging the container closures. It thereby becomes possible to set particularly narrow limit values and thus to carry out the method according to the invention with a high accuracy of aim.

Simultaneously there is the possibility to set the individual closure organs of a closure device so that they produce largely uniform closures, provided of course that the mechanical engineering construction of the closure organs allows these setting parameters to be changed.

An exact and uniform setting of the closure parameters is important in particular for the twist-off closures which are widely distributed in America, which are crimped on in a similar way to crown caps, but are unscrewed like a screw closure by a short twist when opening the bottle. It is important here that the crimping lies in a tight tolerance range, as tops which are not crimped tight enough leak easily or become loose, while tops which are too tightly crimped cannot be screwed off. The tightness or strength of the crimping, i.e. the initial expulsion of the top effected by the crimping, can be tested by means of the method according to the invention. The test can thus be based both on a measurement of the energy and of the decay time. However, a measurement of the frequency of the top vibration is particularly suitable here. The test of the top expulsion should be carried out directly after attaching the closure, as any below- or above-atmospheric pressure developing inside the container has only a very small effect on the measurement result.

The measured values for the frequency, the decay time and the energy are also influenced by sealing material inside the closure, the so-called compound. Deviations in the measurement values may therefore also be due to irregularities in the compound. Bottles or containers with irregularities in the compound are therefore also seen as rejects and are discarded from production.

Drinks bottles are of different sizes, i.e. deviations in their vertical height. Even with standardized bottles of a production batch, the height difference is up to 1.5 mm. As reusable bottles can also come from other manufacturers and can be some years old, height deviations of up to 10 mm occur. The distance between the apparatus for exciting the mechanical vibrations in the closure, for example a magnetic coil, and the closure itself is thereby of the same order and is normally between 3 and 10 mm. The same applies for the distance between the top and the apparatus for detecting the mechanical vibrations, for example a microphone. For the measurement of the decay time and optionally the frequency, different bottle sizes admittedly hardly play a role. However, the energy measurement depends very much on the height of the bottles, as on the one hand the magnetic excitation of the top diminishes with the increase in the distance between the magnetic coil and the top and on the other hand the loss in sound level from the top back to the microphone also increases. The value of the measured energy therefore depends greatly on the distance between the container and the measurement apparatus. The bottle height is therefore preferably determined here by means of a camera, by ultrasound, laser, inductive distance measurement or similar means and taken into account as an adjustment value. The adjustment value depends exponentially on the established distance. However, non-linearities occur in the boundary ranges and it is therefore to be preferred to establish the adjustment value by means of a correction curve produced by individual measurements at different distances. It can be expedient to also correct the established values for decay time and frequency according to the distance between closure and measurement apparatus. As mentioned, the necessary corrections are much smaller here and they can be carried out in general via a pre-programmed curve.

The use of the method according to the invention for determining the size of the air volume in drinks bottles which are filled with a foaming drink such as beer, will now be described. The continuous determination of the atmospheric oxygen entering the bottle during the closure process is a hitherto unsolved problem of the filling process in modern breweries. After being filled and shortly before closure, the bottles or cans are made to foam by means of a thin water jet (so-called water injection), to expel the atmospheric oxygen. The air remaining in the headspace is expelled by the foam and the $CO_2$ thus developed. Up until now it was not possible to check, at full production speed, whether this expulsion of the atmospheric oxygen is proceeding satisfactorily. The water injection may be faulty, as the water injection itself may operate incorrectly or because some of the foam in a bottle which is correctly foamed up in itself can be expelled again from the bottle or can by the centrifugal force at the inlet of the closer, so that air can again enter the headspace of the bottle or can, and is then enclosed by the closure. The atmospheric oxygen then reacts with the beer, which at least leads to an impairment of the taste. To avoid adverse effects on the taste, the entrained air volume is to be smaller than 0.2 and preferably smaller than 0.1 ml. In practice, however, cases occur in which the enclosed air volume is up to some ml. The air volume can be detected with a light barrier only from a size of approx. 1 ml upwards. Smaller air volumes cannot be detected underneath the crown caps by optical means and cannot be detected at all in cans. Up until now the oxygen content in the individual bottles was able to be determined only by spot checks by opening the containers. It was now found that even very small air bubbles under the closure can be recorded by determining the attenuation and/or energy values by means of the method according to the invention.

In a beer bottle foamed up by means of water injection, the foam reaches up to the opening rim and wets the underside of a fitted crown cap closure. The foam wetting the underside of the crown cap closure dampens mechanical vibrations of the top, so that the decay time of the mechanical vibrations is shortened and the energy of the vibrations is decreased.

In the method according to the invention, even very small air volumes under the crown caps become noticeable by a significantly longer decay time and a higher energy of the vibration. Too great an air volume can therefore be recognised by the exceeding of an upper limit value for the decay time or the energy of the vibration.

The decay time of the vibrations also depends on the density of the foam. The foam density decreases relatively quickly after the foaming, so that comparable conditions for determining the air volume by measuring the decay time or the energy of the vibrations exist only if the filling speed is largely constant. With different filling speeds and different periods between foaming, closure and measurement, these differences are preferably included in the evaluation of the measurement results, i.e. the limit values increased to correspond with the lesser damping behaviour of less foam. Expediently, the corrections are again carried out by means of correction tables. In this way, reliable information can be obtained concerning the volume of enclosed air bubbles in the headspace of containers even when the individual measures which are necessary for filling and closing the containers differ as regards time.

Instead of taking the foam density into account using figures based on experience corresponding to the filling speed, the foam density can also be determined directly using measurement techniques, e.g. via the attenuation of a beam of light, dense foam attenuating more, via the attenuation of an x-ray or gamma ray which is more strongly absorbed by higher foam density, by measuring the fine-pore content of the foam by means of a camera, denser foam having finer pores, or by evaluating a capacitive filling height check which can yield information about the foam density. A value obtained in this way can be used to compensate for attenuation or energy values of the vibration such that a reliable detection even of only small air bubbles is ensured under different operating conditions (different speeds, different types of beers, different foaming behaviour).

Both possible uses of the method according to the invention can be combined when packaging drinks which are foamed up directly before closure in order to expel residual air, thus e.g. for beer. In the good bottles, the decay time is within a certain range. If the decay time is longer than the upper limit value of this range, then this is an indication that too large a residual air volume has remained in the bottle. On the other hand, if the decay time is shorter than the lower limit value, then this is an indication that the closure is not fitted correctly on the bottle opening. The same applies to the energy of the vibration, i.e. the time integral of the amplitude; too high an energy value indicates too large a residual air volume, and too small an energy value indicates a badly fitted closure.

The correction, described above only in connection with the testing of the central fit of container closures of the measurement values, for taking into account deviations in the bottle height, and the correction, also mentioned only in connection with the measurement of the residual volume, for taking into account the time elapsed between closure of the containers and carrying out the measurement are each also basically expedient for all other versions described here of the method according to the invention.

The methods described above can also be applied to other containers and closure types such as e.g. cans.

A further possibility of excluding residual air in the product is the so-called brim or black filling when filling fruit juices when hot. In this case, the wetting of the closure or an acceptably small air bubble can be recorded directly behind the closer by means of the method described above.

BRIEF DESCRIPTION OF THE DRAWINGS

An embodiment of the invention is explained in more detail in the following by means of the diagram. There are shown in FIG. 1 in cross section a device for testing container closures FIGS. 2 and 3 the signal for good bottles.

DETAILED DESCRIPTION OF THE INVENTION

Figure 1:
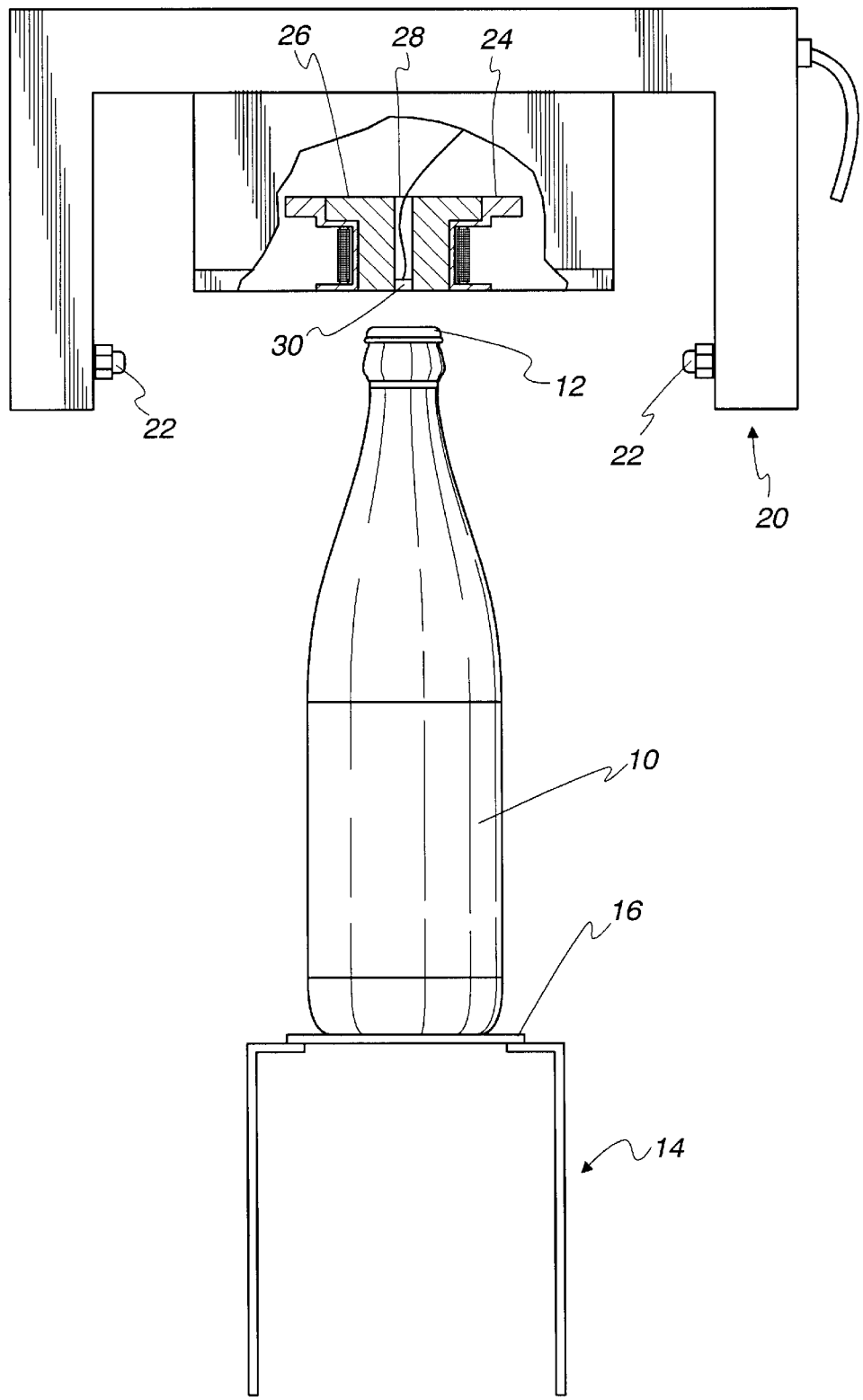
Figure 2:
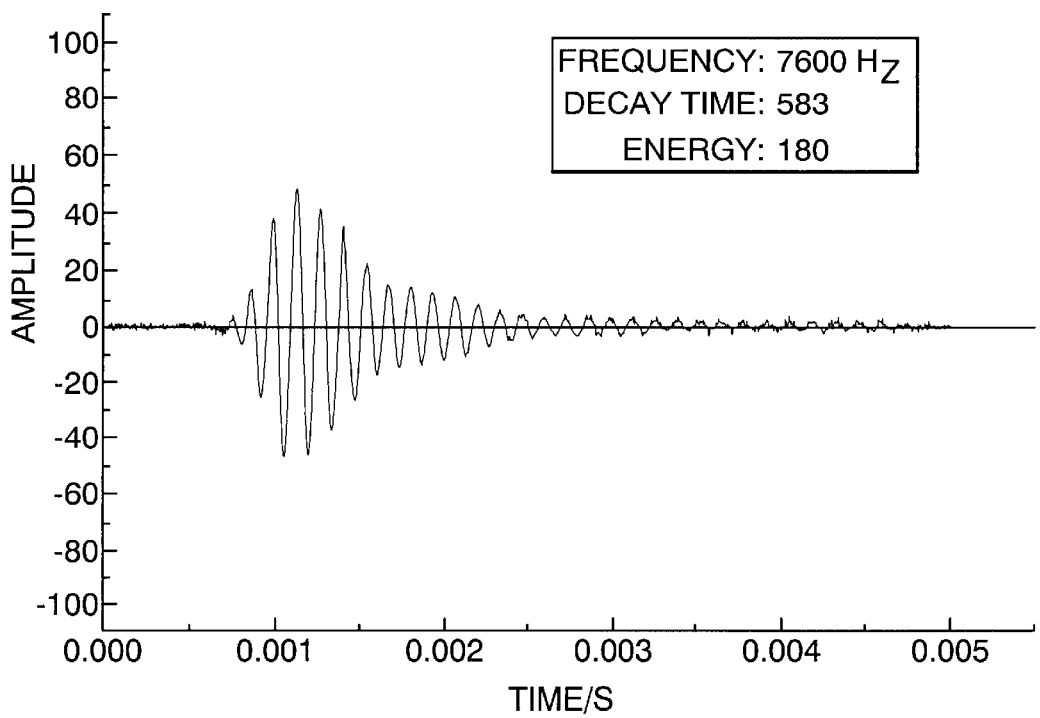
Figure 3:
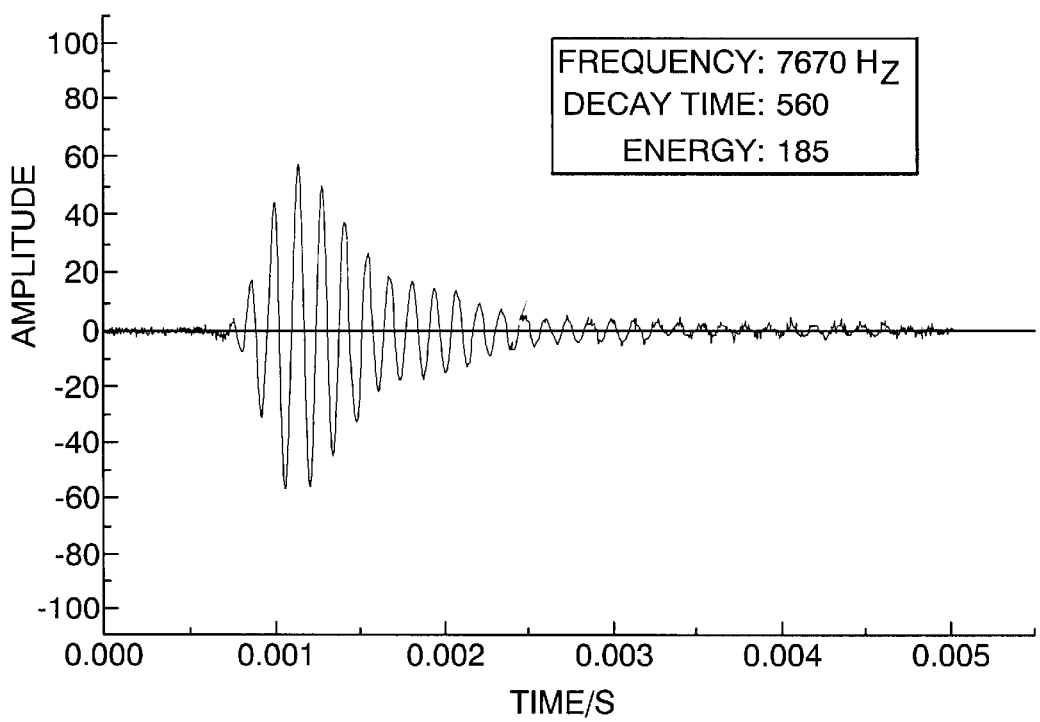

In the embodiment shown in FIG. 1, the liquid container is a usual 0.5 l beer bottle 10 with a metal crown cap 12. The bottle 10 is transported through upright on a conveyor 14 under a measuring apparatus 20 by means of a link chain 16. The measuring apparatus 20 contains a light barrier 22, whose light beam strikes the bottle 10 directly under the mouth opening, which is closed by the crown closure 12. Arranged at a distance of 3 to 10 mm above the crown closure 12 is a magnetic coil 24 whose axis runs vertically and thus parallel to the longitudinal axis of the bottle 12. The magnetic coil 24 contains a core 26 with an axial bore 28 onto whose lower end a microphone 30 is attached.

The height of the light barrier 22 above the conveyor 14 and also the vertical distance between the light barrier 22 and the magnetic coil 24 as well as the microphone 30 is adjustable, so that bottles of different sizes and shapes and also other containers can be examined. The apparatus also has a device, which is not shown, for measuring the distance between the microphone 30 and the crown closure 12. This apparatus operates by means of inductive distance measuring.

In operation, the light barrier 22 produces a trigger signal at the point in time at which the crown closure 12 is located under the magnetic coil 24 and the magnetic coil 24 is excited by this trigger signal by means of a short electric pulse. The short-lived magnetic field thereby produced exerts a short-lived upwardly-directed force on the metal crown closure 12, which triggers a primary mechanical vibration or oscillation in the crown closure 12. This oscillation typically has a frequency of 7 kHz and can therefore be recorded as an acoustic signal by the microphone 30.

The vibration of the crown closure is greatly attenuated and decays within a determined time $\tau$ to the value $1/e$. If the decay time is shorter, then this indicates that the crown cap is not correctly attached. The bottle is then discarded from the production process. If, on the other hand, the decay time is greater, then this indicates that the beer in the bottle was not foamed up enough during the preceding hot-water injection or the foam was forced out so, that there is an air volume in the headspace. These bottles are likewise discarded from the production process.

FIGS. 2 to 8 show diagrams with different signals. The diagrams in FIGS. 2 and 3 relate to good bottles, namely 12 ounce long-necked beer bottles. The parameters for good bottles lie in the following ranges:

Frequency: 7200–7800 Hz

Decay time: 400–600 (relative units)

Energy: 150–250 (relative units)

Figure 4:
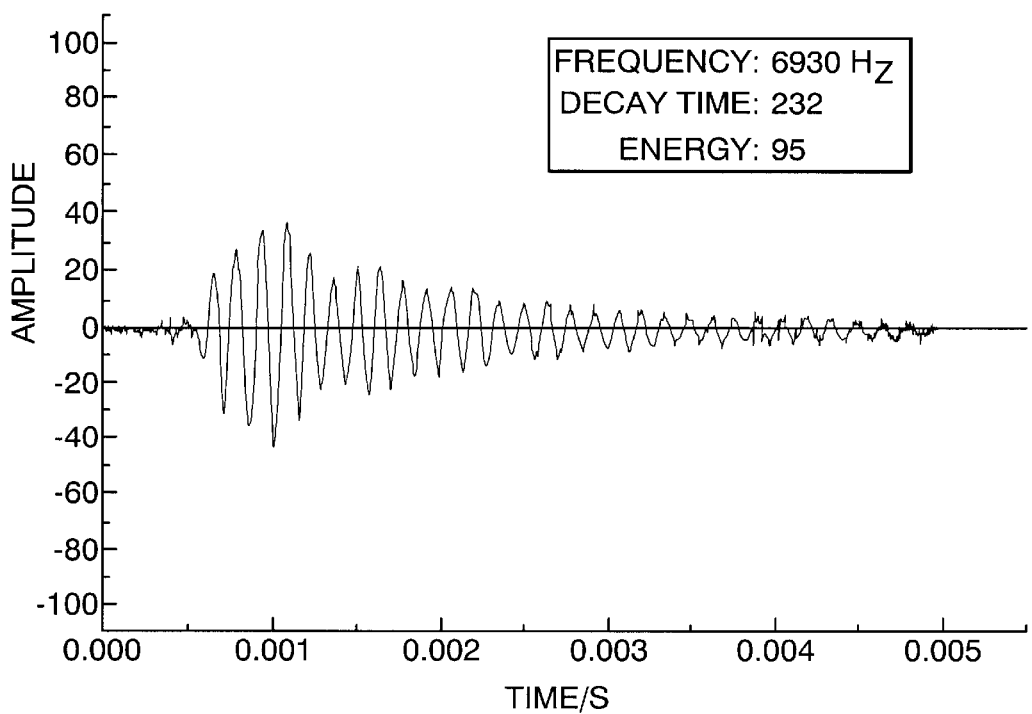
FIGS. 4 to 6 the signal for crooked closures.
Figure 5:
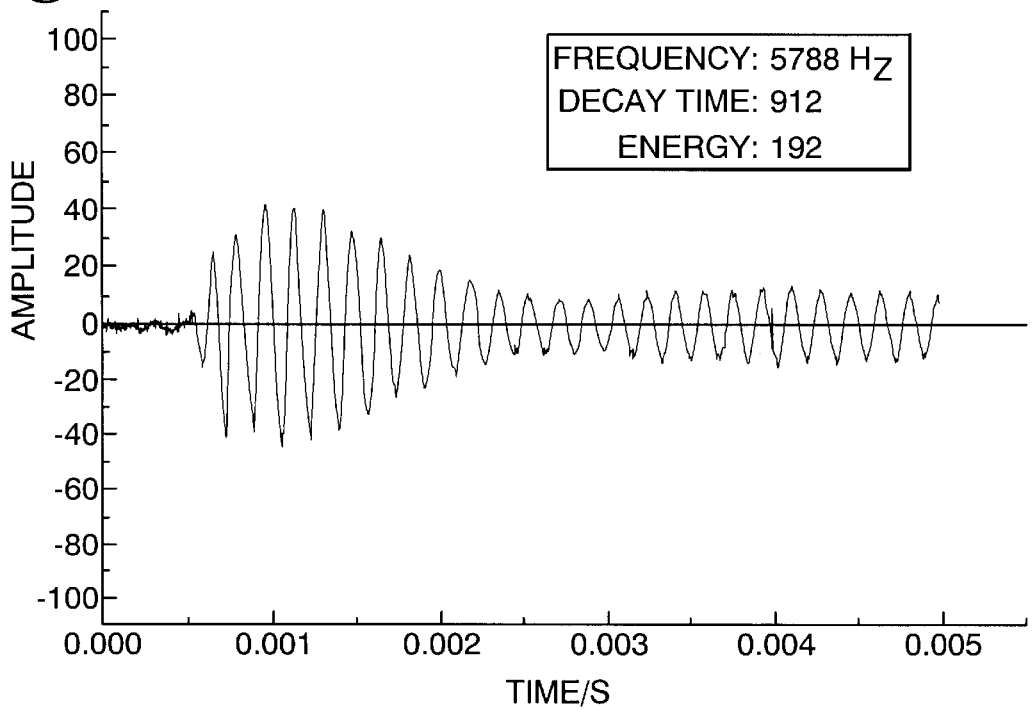
Figure 6:
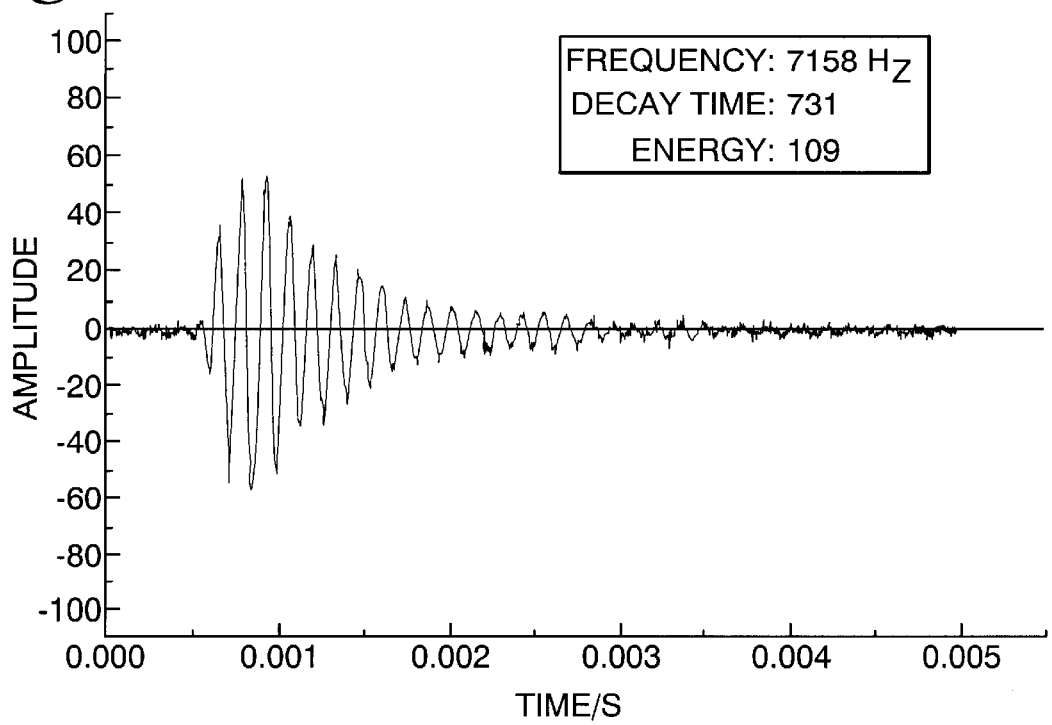

Bottles with a non-centred fitting closure are a special problem. Due to their irregular shape, these closures vibrate in complicated vibration modes, whose coverage frequency fluctuates in a much larger range than normal. This range overlaps with that of good bottles, so that it cannot be excluded that such bad bottles possess similar frequency values to good bottles. The frequency depends very much on the bottle and closure material as well as on the type of closer. Such bad bottles are therefore not identified through frequency alone. The decay time and energy are therefore extracted from the signals as additional parameters. If a bottle differs from good bottles in one of the three parameters frequency, decay time or energy then it is discarded from the production process. Examples of signals of bottles with a crooked closure are given in FIGS. 4 to 6. In FIG. 4, the frequency deviates only slightly, but the decay time and the energy deviate clearly from the values of good bottles. In the diagram in FIG. 5, the frequency and the energy are lower, but the decay time is longer than in good bottles. In the diagram in FIG. 6, the frequency hardly deviates from that of good bottles, while the decay time is clearly longer and the energy is clearly less.

Figure 7:
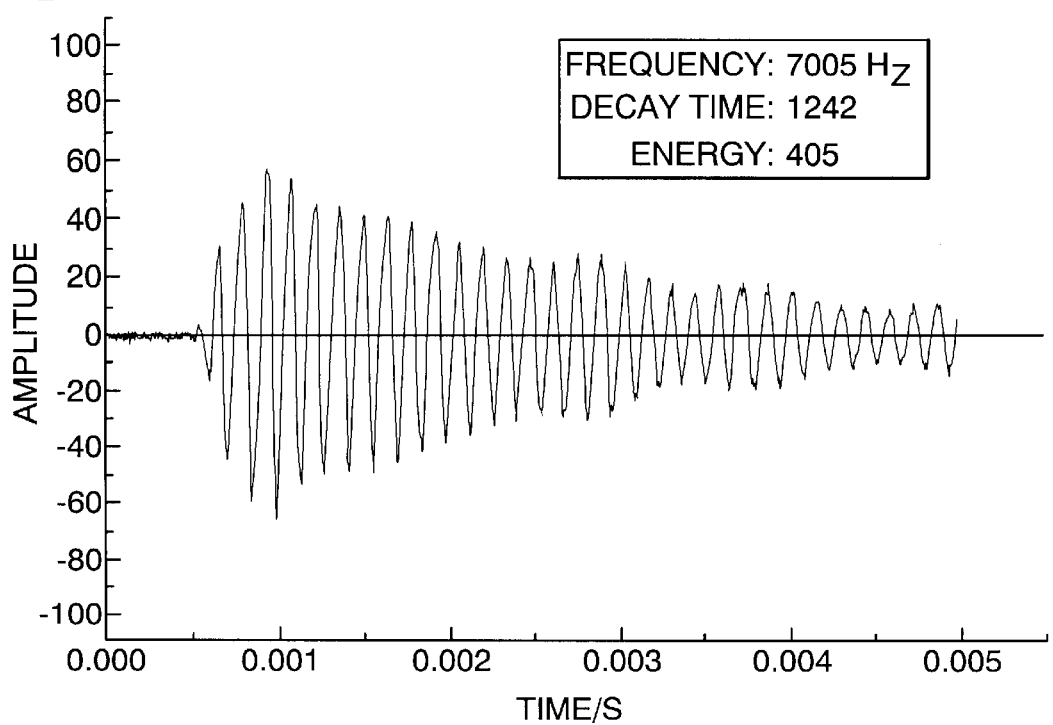
FIGS. 7 and 8 the signal for too-large residual air amounts.
Figure 8:
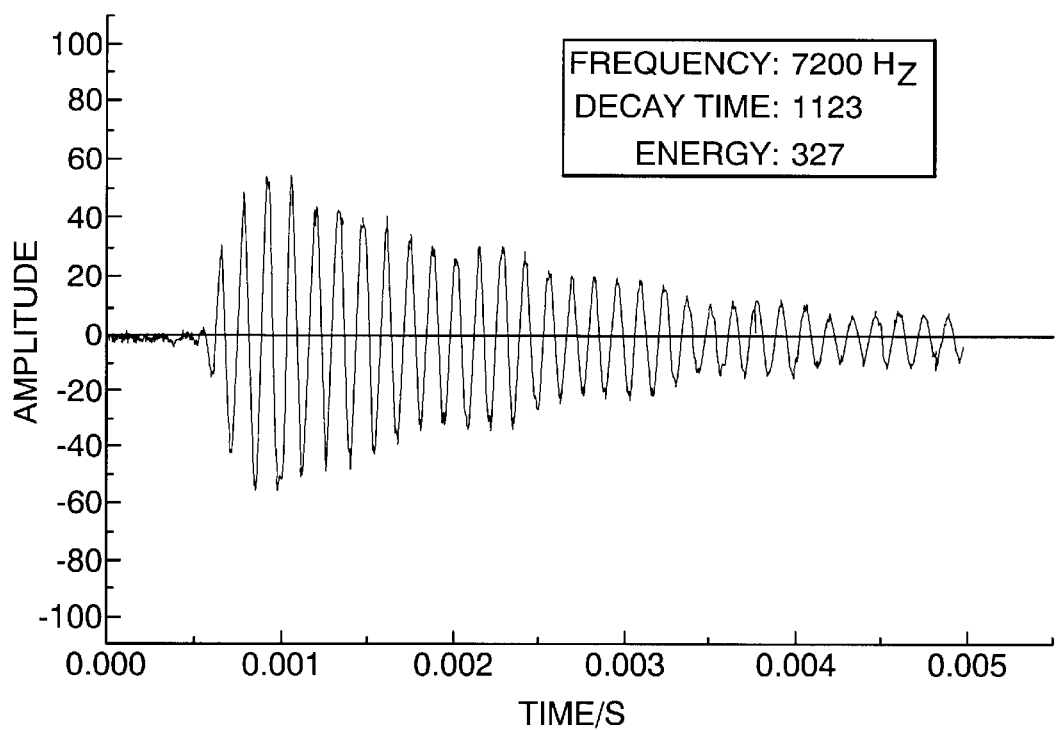

FIGS. 7 and 8 show diagrams with signals for bad bottles with too large a residual air volume. To detect such bad bottles, it is expedient if the measuring is carried out directly after the closer. In bottles with too great a residual air volume the vibration of the closure is not attenuated by the thick foam, which is reflected in the fact that the energy value is increased and the decay time is lengthened. A comparison with the diagrams in FIGS. 2 and 3, which relate to good bottles with little or no residual air volume, shows that the frequency is not sufficient to recognise in such cases that there are clear differences however in the decay time and the energy.

What is claimed is:

1. A method for testing features of a container sealed by means of a closure, such as the central fit of the closure on an opening of the container, tightness of the fit of the closure or residual air volume in containers in which liquid is foamed up prior to closure in order to expel the residual air volume, mechanical vibrations being excited in the closure and the mechanical vibrations being analyzed wherein the analysis of the mechanical vibrations occurs directly after the closure has been fitted before major change in the internal pressure takes place in the container.

2. The method according to claim 1, wherein frequency, decay time, vibration amplitude or time integral of the vibration amplitude are examined in order to analyse the vibrations of the closure and compared with limit values.

3. The method according to claim 1 further comprising ascertaining the correct fit of the closure, wherein decay time or time integral of the vibration amplitude are compared with a limit value, the failure to reach the limit value indicating a false fit of the closure.

4. The method according to claim 3, wherein energy of a vibration is measured which is developed as standing wave between the closure and the liquid surface in the container, this vibration being caused by the mechanical vibration excited in the closure.

5. The method according to claim 1 further comprising ascertaining the residual air volume, wherein decay time or the time integral of the signal amplitude is compared with an upper limit value, the exceeding of the limit value indicating too large a residual air volume.

6. The method according to claim 1 further comprising testing the tightness of the attachment of a closure to the opening of a container, wherein the mechanical vibrations are excited in the closure and the mechanical vibrations are then analyzed by comparing the decay time of the vibration and the time integral of the vibration amplitude with limit values.

7. The method according to claim 1, wherein the mechanical vibrations in the closure are excited by a pulse produced by a vibration generator and the mechanical vibrations excited in the closure are recorded as an acoustic signal.

8. The method according to claim 7, wherein the acoustic signal is recorded by a microphone, and the distance between the vibration generator and the closure and between the microphone and the closure is measured, and values for frequency, decay time, the vibration amplitude or the time integral of the vibration amplitude are ascertained and adjusted according to the measured distances.

9. The method according to claim 1, wherein values for frequency, decay time, the vibration amplitude or the time integral of the vibration amplitude are ascertained and corrected taking into account the time which has elapsed between the attachment of the closures and the carrying out of the measuring.

10. The method according to claim 1 wherein foam density of the liquid packaged in the container is measured and values for the frequency, the decay time, the vibration amplitude or the time integral of the vibration amplitude are ascertained and corrected taking into account the measured foam density.

11. The method according to claim 1, whereby in the operation a larger number of bottles is each case provided with a corresponding number of closure organs by means of a closure device, wherein each closure organ is allocated its own limit values for the measured vibration parameters.

* * * * *